United States Patent
Carnick et al.

(10) Patent No.: US 9,837,735 B2
(45) Date of Patent: Dec. 5, 2017

(54) COVER WITH INTEGRATED HINGE AND LOCKING MECHANISM FOR VEHICLE ELECTRICAL SYSTEM COMPONENT

(71) Applicant: Sumitomo Wiring Systems, Ltd., Yokkaichi, Mie (JP)

(72) Inventors: Brian Carnick, New Baltimore, MI (US); Bennie James Malcom, Detroit, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 17 days.

(21) Appl. No.: 15/042,079

(22) Filed: Feb. 11, 2016

(65) Prior Publication Data
US 2017/0232911 A1    Aug. 17, 2017

(51) Int. Cl.
| | |
|---|---|
| *H01R 13/506* | (2006.01) |
| *H01R 11/28* | (2006.01) |
| *B60R 16/02* | (2006.01) |
| *H01R 13/50* | (2006.01) |

(52) U.S. Cl.
CPC ........ *H01R 11/284* (2013.01); *B60R 16/0215* (2013.01); *H01R 13/501* (2013.01); *H01R 13/506* (2013.01)

(58) Field of Classification Search
CPC .. H01R 11/284; H01R 13/506; H01R 13/501; H01R 13/52; H01M 2/34; B60R 16/0215
See application file for complete search history.

(56) References Cited

U.S. PATENT DOCUMENTS

| | | | | |
|---|---|---|---|---|
| 3,937,636 A | * | 2/1976 | Slautterback | H01M 2/043 |
| | | | | 429/179 |
| 4,415,044 A | * | 11/1983 | Davis | H02G 3/083 |
| | | | | 174/138 F |
| 4,778,408 A | * | 10/1988 | Morrison | H01R 11/282 |
| | | | | 439/522 |
| 5,338,898 A | * | 8/1994 | Luciano | H01R 13/501 |
| | | | | 174/138 F |
| 5,346,407 A | * | 9/1994 | Hood | B60R 16/04 |
| | | | | 439/202 |
| 5,439,759 A | * | 8/1995 | Lippert | H01M 2/32 |
| | | | | 174/138 F |
| 5,576,516 A | | 11/1996 | Kameyama | |
| 5,645,448 A | * | 7/1997 | Hill | H01H 85/205 |
| | | | | 439/522 |

(Continued)

FOREIGN PATENT DOCUMENTS

JP    H10322851 A    4/1998

*Primary Examiner* — Justin Rephann
(74) *Attorney, Agent, or Firm* — Reising Ethington, P.C.

(57) ABSTRACT

A cover for a vehicle electrical system component, such as a pre-fuse assembly, that includes an integrated hinge and locking mechanism. The integrated hinge allows a pivoting cover portion to easily be rotated out of the way in order to give access to an underlying component (e.g., a jump post), while the integrated locking mechanism allows that same cover to be securely locked onto itself when no access is needed. The cover is not limited to a pre-fuse assembly and may be used with other vehicle electrical system components, such as a power distribution device (e.g., a power distribution box, an electrical connection box, a junction box assembly, etc.), a wire harness protector, etc.

16 Claims, 3 Drawing Sheets

(56) References Cited

U.S. PATENT DOCUMENTS

| | | | | |
|---|---|---|---|---|
| 5,763,835 A * | 6/1998 | Huynh-Ba | G02B 6/4446 | 174/138 F |
| 5,804,770 A * | 9/1998 | Tanaka | H01M 2/206 | 174/138 F |
| 5,902,695 A * | 5/1999 | Siedlik | H01M 2/32 | 429/181 |
| 5,910,029 A * | 6/1999 | Siedlik | H01M 2/32 | 174/138 F |
| 5,942,737 A * | 8/1999 | Waters | H01H 9/226 | 200/50.02 |
| 5,977,485 A * | 11/1999 | Yoshimura | H01M 2/206 | 174/135 |
| 6,124,055 A * | 9/2000 | Stocchiero | H01M 2/043 | 429/175 |
| 6,426,465 B1 * | 7/2002 | Kosuge | H01R 11/284 | 174/135 |
| 6,533,619 B2 * | 3/2003 | Wakata | H01R 13/642 | 439/202 |
| 6,576,838 B2 * | 6/2003 | Matsumura | H01H 85/044 | 174/135 |
| 6,679,708 B1 | 1/2004 | Depp | | |
| 7,361,841 B1 * | 4/2008 | Smolen | H01R 4/70 | 174/135 |
| 8,492,015 B2 * | 7/2013 | Ramakrishnan | H01M 2/043 | 174/138 F |
| 8,933,338 B2 * | 1/2015 | Ikeda | H01M 2/305 | 174/138 F |
| 9,035,179 B2 * | 5/2015 | Matsumoto | H01H 85/175 | 174/66 |
| 2001/0049055 A1 | 12/2001 | Saito | | |
| 2002/0050382 A1 * | 5/2002 | Kosuge | H01R 11/284 | 174/66 |
| 2002/0168566 A1 * | 11/2002 | Ohtsuka | H01M 2/043 | 429/175 |
| 2011/0315431 A1 * | 12/2011 | Mase | H01R 4/34 | 174/138 F |
| 2016/0006003 A1 * | 1/2016 | Ohashi | H01M 2/1072 | 429/175 |

* cited by examiner

COVER WITH INTEGRATED HINGE AND LOCKING MECHANISM FOR VEHICLE ELECTRICAL SYSTEM COMPONENT

FIELD

The present invention relates generally to a cover for a vehicle electrical system component and, more particularly, a plastic cover with an integrated hinge and locking mechanism for a vehicle electrical system component, such as a pre-fuse assembly.

BACKGROUND

Many different types of vehicle electrical system components use covers or housings to protect and isolate electrical components.

Some of these covers are designed to provide easy access to an underlying electrical component, like a battery jump post, but in so doing do not provide an adequate means for locking and securing the cover in place. Other covers may be more secure in their locking design, but come with complex and expensive hinges and securing features that make them less desirable for certain cost sensitive applications.

Therefore, there is a need to provide a protective cover for a vehicle electrical system component that includes an integrated hinge and locking mechanism that is easy to use, adequately secure in its design, and relatively inexpensive to manufacture.

SUMMARY

According to one aspect, there is provided a cover for a vehicle electrical system component, comprising: a main body portion; a pivoting cover portion; an integrated hinge connected between the main body portion and the pivoting cover portion; and an integrated locking mechanism connected to the main body portion and the pivoting cover portion and including at least one post feature and at least one clamping feature, wherein the at least one post feature is captured within the at least one clamping feature when the integrated hinge is in a closed position and the at least one post feature is released from the at least one clamping feature when the integrated hinge is in an opened position.

DRAWINGS

Preferred exemplary embodiments of the invention will hereinafter be described in conjunction with the appended drawings, wherein like designations denote like elements, and wherein.

Figure 1:
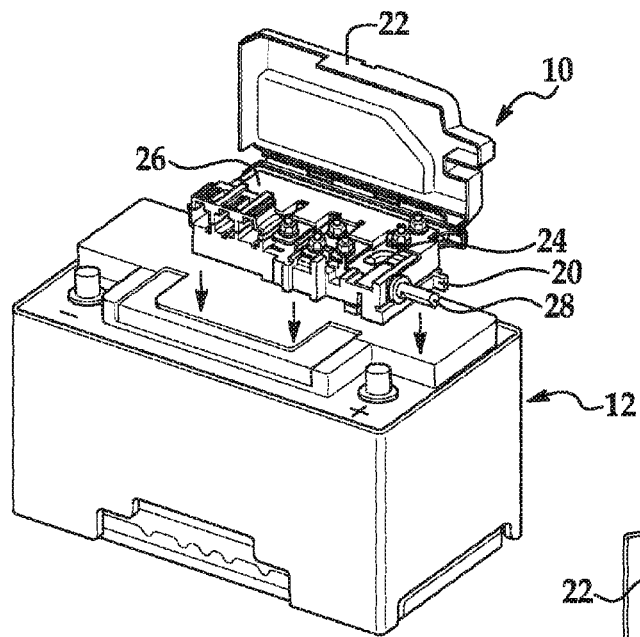
FIG. 1 is a perspective view of an exemplary pre-fuse assembly being attached on top of a vehicle battery, the pre-fuse assembly includes a cover.
Figure 2:
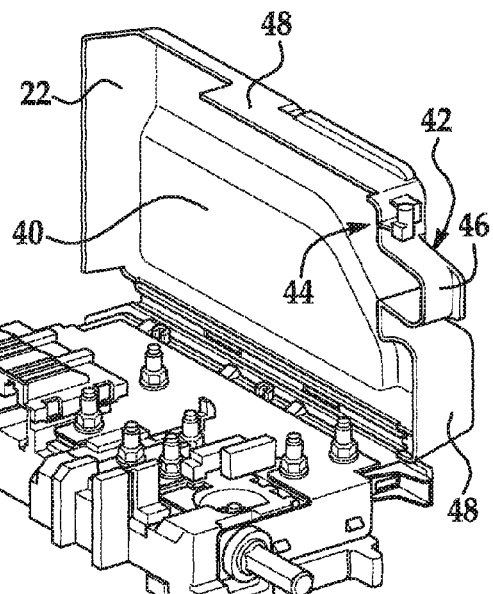
FIG. 2 is a perspective view of the pre-fuse assembly of FIG. 1, wherein the cover is opened and a pivoting cover portion is closed.
Figure 4:
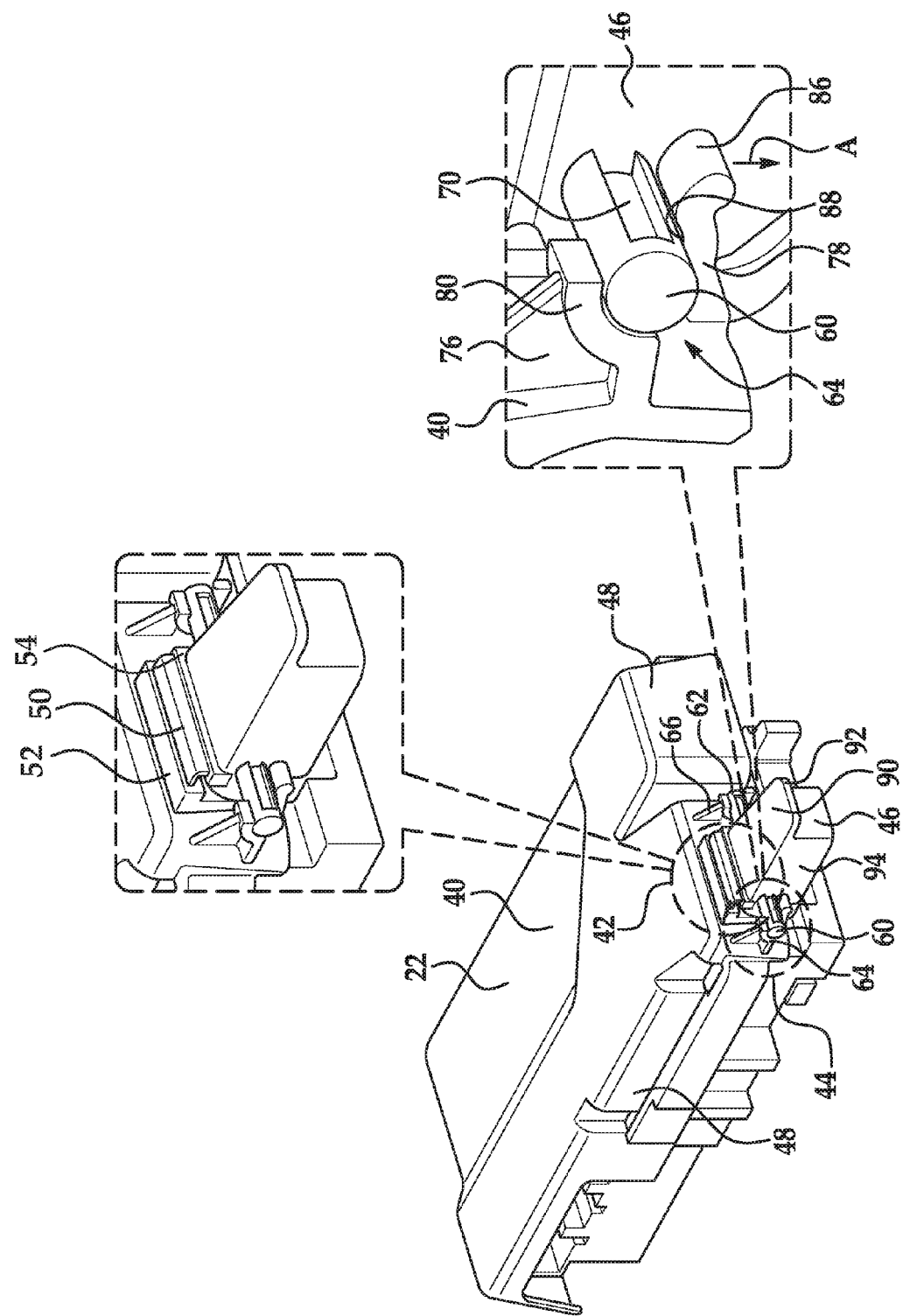
Figure 5:
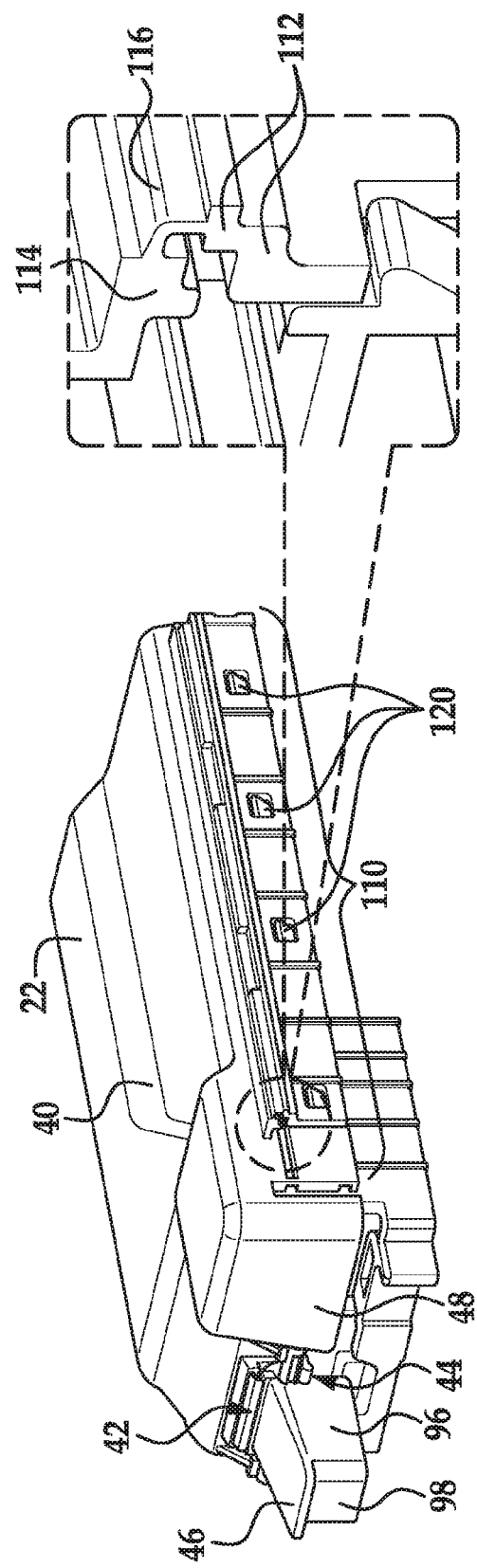

FIG. 4 is a perspective view of the pre-fuse assembly of FIG. 1, wherein the cover is closed, the pivoting cover portion is closed, and a first enlarged inset portion illustrates some features of an exemplary integrated hinge and a second enlarged inset portion illustrates some features of an exemplary integrated locking mechanism; and FIG. 5 is a different perspective view of the pre-fuse assembly of FIG. 1, wherein the cover is closed, the pivoting cover portion is closed, and an enlarged inset portion illustrates some features of an additional integrated hinge that is optional.

DESCRIPTION

There is described herein a cover for a vehicle electrical system component that includes an integrated hinge and locking mechanism. A non-limiting embodiment of a cover with an integrated hinge and locking mechanism is shown in FIGS. 1-5, where that cover is designed for use with a vehicle pre-fuse assembly 10 that sits atop a vehicle battery 12. The integrated hinge allows a pivoting cover portion to easily be rotated out of the way in order to give access to an underlying component (e.g., a jump post), while the integrated locking mechanism allows that same cover to be securely locked onto itself when no access is needed. It should be appreciated that the cover of the present application is not limited to a pre-fuse assembly and may be used with any number of different vehicle electrical system components, such as a power distribution device (e.g., a power distribution box, an electrical connection box, a junction box assembly, etc.), a wire harness protector, or some other suitable component in a vehicle electrical system.

The pre-fuse assembly 10, also known as a pre-fuse box or a battery fuse terminal, includes a housing 20, a cover 22, a battery post connector 24, a master fuse 26, a jump post 28 and any number of other components. FIG. 1 shows the pre-fuse assembly 10 before it is installed on top of the vehicle battery 12, whereas FIGS. 2-5 show the pre-fuse assembly by itself. The pre-fuse assembly 10 is designed to protect certain components within a vehicle electrical system against short circuits and to provide a user with easy access to a jump post for jump starting a dead battery. The pre-fuse assembly 10 is a current-limiting electrical device that is mounted on top of the vehicle battery 12 and includes a number of fuses for limiting the current flowing from the vehicle battery to a power distribution device and includes a horizontal jump post for providing easy access when jump starting a dead battery. Because the present cover may be used with any number of different vehicle electrical system components (not just a pre-fuse assembly) and because the general operation of items 24-28 is known in the art, a further description of such items has been omitted.

The cover 22 is preferably made of a molded plastic material (e.g., a thermoset plastic like polypropylene-20% talc filled) and protects the components of the pre-fuse assembly 10 when the cover is closed and provides access to the same components when it is opened. With reference to the exemplary embodiment shown in FIGS. 2-5, the cover 22 may be a single, integrally formed part and generally includes a main body portion 40, an integrated hinge 42, an integrated locking mechanism 44, and a pivoting cover portion 46. The main body portion 40 can be flat or contoured to accommodate the shape of the interior components of the pre-fuse assembly 10, as well as to satisfy other packaging and space requirements, and the main body portion includes at least one downwardly turned flange 48 that extends from a side of the main body portion in a generally perpendicular manner. The illustrated embodiment has downwardly turned flanges on at least three sides of the main body portion 40, including the same side where the pivoting cover portion 46 is operably connected by way of the integrated hinge 42.

Figure 3:
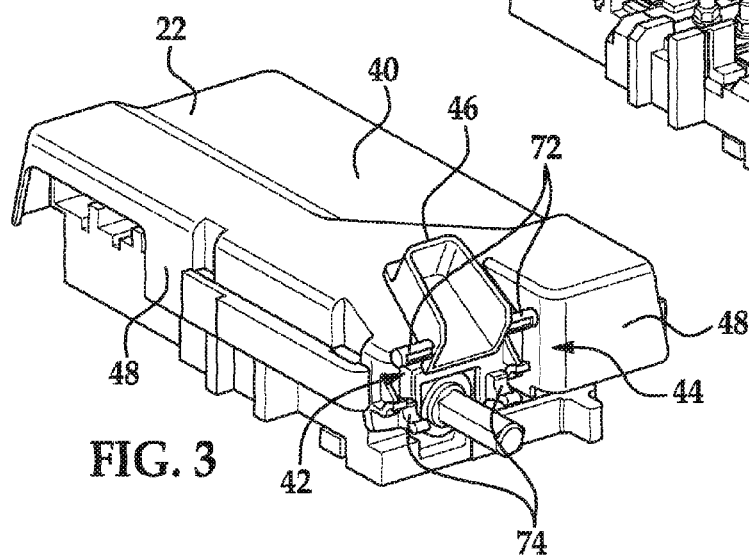
FIG. 3 is a perspective view of the pre-fuse assembly of FIG. 1, wherein the cover is closed and the pivoting cover portion is opened.

The integrated hinge 42 rotatably connects the pivoting cover portion 46 to the main body portion 40 and provides a user with easy access to the jump post 28 in the event that he or she needs to jump start the vehicle. Therefore, in this example, the pivoting cover portion 46 is a jump post cover, although it does not necessarily need to be. The integrated hinge 42 is a so-called "living hinge" and includes a thinner hinge section 50 where the plastic material is purposely thinner or weaker than in first and second thicker hinge sections 52, 54; this enables the thinner hinge section 50 to flex and bend as the pivoting cover portion 46 is rotated between closed (FIGS. 1, 2, 4 and 5) and opened positions (FIG. 3). The first thicker hinge section 52 is an elongated section that is integrally formed with and, thus, attached to the downwardly turned flange 48 or some other section of the main body portion 40 along the length of section 52. The second thicker hinge section 54 is also an elongated section that is integrally formed with and connecting along its length, except this feature is connected to a top surface of the pivoting cover portion 46.

As illustrated in one of the enlarged insets of FIG. 4, the first and second thicker hinge sections 52 and 54 have a greater thickness than thinner hinge section 50 so that section 50 intentionally flexes or bends when the integrated hinge 42 is engaged by a user. This type of hinge design, where all of the different hinge sections or components are integrally made of the same material such that a commonly molded piece of plastic material extends across the hinge, is what makes the integrated hinge 42 a "living hinge." Some of the potential benefits of a pivoting cover portion 46 attached with an integrated living hinge 42 include: the cover portion will not become separated and potentially lost from the rest of the assembly as they are all part of single piece of material; the cover portion does not require a separate tether or cord to attach it to the assembly; and the cover is easier and less expensive to manufacture than covers that require separate non-integrally formed hinge components that must be molded and then separately assembled.

The integrated locking mechanism 44 secures the pivoting cover portion 46 to the main body portion 40 when the integrated hinge is in a closed position and includes first and second post features 60, 62 and first and second clamping features 64, 66. The enlarged inset of FIG. 4 only shows one of the post/clamping feature pairs, as a corresponding pair with a similar configuration is located on the opposite side of the pivoting cover portion 46, but is not shown in the enlarged inset. According to this embodiment, the post feature 60 is integrally formed with and extends from a side surface of the pivoting cover portion 46 and the clamping feature 64 is integrally formed with and extends from the downwardly turned flange of the main body portion 40; however, this is not mandatory, as the arrangement could be reversed so that the post feature is attached to the main body portion and the clamping feature is attached to the cover portion instead. The post feature 60 is shown as a cylindrical or columnar extension extending from the side of the pivoting cover portion 46 in a generally horizontal manner. Post feature 60 may optionally include a recess or clearance portion 70 that allows tooling to be properly released following the molding process, but this is not required.

The clamping feature 64 is designed to receive and retain the post feature 60 when the pivoting cover portion 46 is rotated into a closed position. According to the exemplary embodiment of FIG. 4, clamping feature 64 includes a structural mount 76, a lower arcuate piece 78, and an upper arcuate piece 80. The structural mount 76 may be a triangular strengthening rib, like that shown in the drawing, or it may have another configuration so long as the clamping feature 64 has enough structural integrity and strength to withstand engagement of the integrated locking mechanism 44 by a user. At least one of the lower or upper arcuate pieces 78, 80 acts as a detent for receiving and retaining the post feature 60 when the pivoting cover portion is rotated into a closed position; it is not necessary for both arcuate pieces to physically contact and receive the post feature, but this is possible. For example, the integrated locking mechanism 44 may be designed so that only the lower arcuate piece 78 actually contacts the outer cylindrical surface of the post feature 60 so that there is only one tactile interaction during engagement of the locking mechanism 44. In a different example, only the upper arcuate piece 80 would contact the post feature 60 as it is rotated into a closed position. When viewing the clamping feature 64 head on (i.e., side view of the cover), it can be seen that the lower and upper arcuate pieces 78, 80 are laterally offset from one to form a broken C-shape, but this is certainly not necessary. The front edge 86 of the lower arcuate piece 78 may have a full bull nose or similar profile to facilitate the detent functionality of the component by allowing the outer cylindrical surface of the post feature 60 to slide along the bull nose and slightly deflect the lower arcuate piece 78 in a direction A until the post feature clears the bull nose and resides within a recessed pocket 88 on the inner surface of the lower arcuate piece 78. Other configurations and arrangements are certainly possible, such as where the bull nose and recess are provided on the upper arcuate piece 80 instead or where only one pair of post/clamping features are included instead of two.

The pivoting cover portion 46 is designed to protect the jump post 28 or some other feature requiring access. According to the illustrated embodiment, the pivoting cover portion 46 includes a top surface 90 with a thumb or finger engagement feature 92, a pair of side surfaces 94, 96, and an end surface 98 that all together form a boxlike shield or cover for protecting and isolating the horizontally extending jump post 28. An example of the interior cavity of the pivoting cover portion 46 is shown in FIG. 3, where the cover portion has been rotated to the opened position. As mentioned above, it is not necessary for the cover of the present application to only be used with a pre-fuse assembly sitting atop a vehicle battery; in those instances where the cover is used in some other application, the pivoting cover portion 46 may protect a different component that typically needs to be isolated but occasionally needs access to it.

Turning now to FIG. 5, there is shown another integrated hinge 110 that may be optionally added to the cover 22. In the illustrated example, the integrated hinge 110 pivotally connects the cover 22 to the housing 20 so that the cover can be pivoted between opened and closed positions. As with the integrated hinge 42 that was previously described, the additional integrated hinge 110 is also a so-called "living hinge" where the plastic material is purposely thinner than in other areas of the hinge and is molded from a common plastic material. The enlarged inset of FIG. 5 demonstrates this arrangement, where thicker hinge sections 112, 114 are separated by a thinner hinge section 116 that is purposely designed to bend and flex. Much of the previous discussion in terms of integrated or living hinges also applies to integrated hinge 110 as well. The integrated hinge 110 may also include several attachment features 120 for snapping the cover 22 in place and securing it to the housing 20. The integrated hinge 110 is not mandatory, as other hinge or fastening arrangements could be used instead.

In operation, B+ power is provided from the battery 12, through the pre-fuse assembly 10, and to a power distribution device, not shown. If the pre-fuse assembly 10 requires service, a service technician can gain access to the pre-fuse components by opening the cover 22 via the integrated hinge 110. If the vehicle battery 12 is dead and needs to be jump started, then a user can gain access to the jump post 28 via the integrated hinge 42 without having to engage the hinge 110, as they would simply apply enough force to overcome the tactile grasp of the integrated locking mechanism 44 and rotate the pivoting cover portion 46 to an opened position. The effects of the cover 22 are that the integrated hinge 110 provides limited access to the components of the pre-fuse assembly 10 for qualified service technicians, while the integrated hinge 42 provides more ready access to a component like the jump post 28 for a typical user.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A cover for a vehicle electrical system component, comprising:
    a main body portion;
    a pivoting cover portion;
    an integrated hinge connected between the main body portion and the pivoting cover portion; and
    an integrated locking mechanism connected to the main body portion and the pivoting cover portion and including at least one post feature and at least one clamping feature, the at least one post feature extends outwardly from the main body portion or the pivoting cover portion and the at least one clamping feature extends outwardly from the other of the main body portion or the pivoting cover portion, the at least one clamping feature includes an arcuate piece and is open towards the at least one post feature, the at least one clamping feature with the arcuate piece is sized and shaped to act as a detent when the at least one clamping feature receives the at least one post feature, wherein the at least one post feature is captured within the at least one clamping feature and engages the arcuate piece when the integrated hinge is in a closed position, and the at least one post feature is released from the at least one clamping feature when the integrated hinge is in an opened position.

2. The cover of claim 1, wherein the entire cover including the main body portion, the pivoting cover portion, the integrated hinge, and the integrated locking mechanism is a single integrally formed part made of a molded plastic material.

3. The cover of claim 1, wherein the main body portion includes a downwardly turned flange that extends from a side of the main body portion in a generally perpendicular manner, and the integrated hinge is connected to the downwardly turned flange.

4. The cover of claim 1, wherein the integrated hinge is a living hinge and includes a hinge section that is designed to flex when the integrated hinge is moved between closed and opened positions.

5. The cover of claim 4, wherein the hinge section is a thinner hinge section and the integrated hinge further includes a first thicker hinge section connected to the main body portion, a second thicker hinge section connected to the pivoting cover portion, and the thinner hinge section connected between the first and second thicker hinge sections, and the thinner hinge section has a lesser thickness than that of the first and second thicker hinge sections so that the thinner hinge section is designed to flex when the integrated hinge is moved between closed and opened positions.

6. The cover of claim 5, wherein the first thicker hinge section is an elongated section integrally formed with and connected to the main body portion along its length, the second thicker hinge section is an elongated section integrally formed with and connected to the pivoting cover portion along its length, and the thinner hinge section is an elongated section integrally formed with and connected to both the first and second thicker hinge sections.

7. The cover of claim 1, wherein the at least one post feature includes a cylindrical extension that extends in a generally horizontal manner and is sized and shaped to be received within the at least one clamping feature when the integrated hinge is in a closed position.

8. The cover of claim 1, wherein the at least one post feature includes a first post feature extending from a first side surface of the pivoting cover portion and a second post feature extending from a second side surface of the pivoting cover portion.

9. The cover of claim 1, wherein the arcuate piece is either a lower arcuate piece or an upper arcuate piece and the at least one clamping feature further includes a structural mount extending from the main body portion, the lower arcuate piece is supported by the structural mount and opens towards the at least one post feature, and the upper arcuate piece is supported by the structural mount and opens towards the at least one post feature, wherein the lower or upper arcuate piece is configured as the detent to retain the at least one post feature when the integrated hinge is in a closed position.

10. The cover of claim 9, wherein the lower or upper arcuate piece includes a front edge with a bull nose configured to allow an outer cylindrical surface of the at least one post feature to slide along and slightly deflect the lower or upper arcuate piece out of the way until the at least one post feature clears the bull nose and settles within a recessed pocket on an inner facing surface of the lower or upper arcuate piece.

11. The cover of claim 10, wherein the lower and upper arcuate pieces are laterally offset from one another.

12. The cover of claim 1, wherein the at least one clamping feature includes a first clamping feature attached to a downwardly turned flange of the main body portion and a second clamping feature attached to the downwardly turned flange of the main body portion.

13. The cover of claim 1, further comprising an additional integrated hinge extending along an edge of the cover and pivotally connecting the cover to a housing.

14. The cover of claim 1, wherein the cover is part of a pre-fuse assembly, and the pivoting cover portion is configured to shield a horizontal jump post extending from the pre-fuse assembly.

15. The cover of claim 14, wherein the pivoting cover portion includes a top surface, a pair of side surfaces, and an end surface that together form a boxlike formation configured to fit over and shield the horizontal jump post extending from the pre-fuse assembly, and the at least one post feature extends from one of the pair of side surfaces.

16. The cover of claim 1, wherein the cover is part of a power distribution device, and the pivoting cover portion is configured to shield a wire harness or other connector.

* * * * *